United States Patent [19]

Meyer

[11] 4,357,518

[45] Nov. 2, 1982

[54] MULTISCHEDULE WELDING CONTROL

[75] Inventor: Gilbert F. Meyer, Brookfield, Wis.

[73] Assignee: Machinery Welder Manufacturing Corp., Greendale, Wis.

[21] Appl. No.: 293,416

[22] Filed: Aug. 14, 1981

[51] Int. Cl.³ .............................................. B23K 9/10
[52] U.S. Cl. .................................. 219/130.1; 219/132
[58] Field of Search ................ 219/130.1, 132, 137.21, 219/125.1

[56] References Cited

U.S. PATENT DOCUMENTS

| | | |
|---|---|---|
| 2,529,111 | 11/1950 | Steinberger . |
| 2,951,972 | 9/1960 | Pomazal . |
| 3,213,262 | 10/1965 | Marchand ...................... 219/137.71 |
| 3,267,251 | 8/1966 | Anderson ......................... 219/125.1 |
| 3,324,379 | 6/1967 | Mulder ............................ 219/130.1 |
| 3,567,902 | 3/1971 | Stearns et al. . |
| 3,689,734 | 9/1972 | Burley et al. . |
| 4,216,368 | 8/1980 | Delay .................................. 219/132 |

FOREIGN PATENT DOCUMENTS

| | | |
|---|---|---|
| 2840230 | 3/1979 | Fed. Rep. of Germany ........................ 219/137.71 |
| 661671 | 11/1951 | United Kingdom . |

Primary Examiner—C. C. Shaw
Attorney, Agent, or Firm—Wheeler, House, Fuller & Hohenfeldt

[57] ABSTRACT

An electric arc welding control unit for controlling welding parameters such as voltage and wire feed rate. Manual potentiometer controls are operated from the outside of the unit to select values for the welding parameters. An override switch inaccessible to the outside of the control unit defeats the exterior controls and actuates second control means comprising interior controls which can be preset to define desirable schedules of welding parameter values. A selector switch is used to select one of the welding schedules. When they are defeated the exterior controls become dummy controls which do not affect the welding schedules.

8 Claims, 1 Drawing Figure

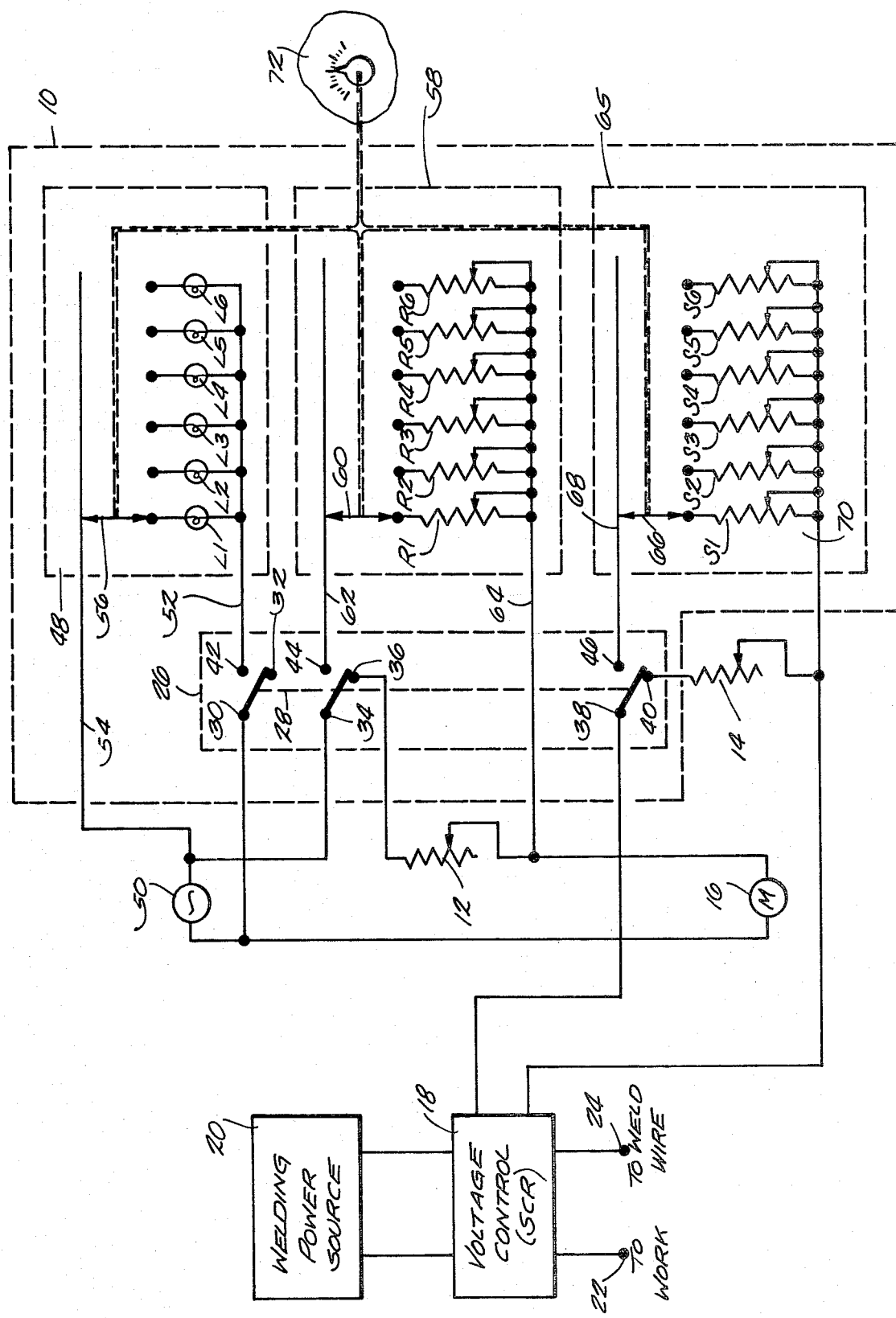

MULTISCHEDULE WELDING CONTROL

TECHNICAL FIELD

The present invention relates to programmable electric circuit means for controlling welding parameters, particularly welding voltage and welding wire feed rate, during electric arc welding.

BACKGROUND ART

U.S. Pat. No. 3,689,734, issued to Burley et al. on Sept. 5, 1972 teaches a control system for automatic welding in which an operator can select one of several welding programs with a selector switch. The selector switch connects into circuit one of several program cards, each of which can have potentiometers and other circuitry for controlling the value of one or more welding parameters. But Burley does not teach a system in which the welding program is inaccessible to the machine operator. U.S. Pat. No. 3,567,902, issued to Stearns et al. on Mar. 2, 1971 similarly teaches a system in which a welding program can be defined on a printed circuit card which is inserted into the unit to operate according to the chosen welding program. But again, the operator participates in inserting program cards into the unit, and has controls for adjusting other welding parameters. Other patents which may have some pertinence are U.S. Pat. No. 2,529,111, issued to Steinberger on Nov. 7, 1950; U.S. Pat. No. 2,951,972, issued to Pomazal on Sept. 6, 1960; and British Pat. No. 661,671, issued to Ford Motor Co. on Nov. 28, 1951.

In electric arc welding the proper welding parameters, such as welding voltage and amperage, must be tailored for a given application. Welders typically are more concerned with welding speed, which depends primarily on wire feed rate, than with welding quality, which depends on selection of a particular welding schedule of amperage, voltage and other parameters not necessarily related to welding speed. Prior art welding controls have allowed the welder himself to vary the welding voltage, wire feed rate, and other parameters from the appropriate values for the job at hand. Welding quality has sometimes suffered as a result.

While the welder should not have unbridled discretion to change recommended settings for welding parameters as he sees fit, the welding unit should have several welding programs, allowing the operator to do several different types of jobs with one unit and without constant supervision. And finally, the programmable welding unit should include override means to allow occasional external control of the welding parameters.

SUMMARY OF THE INVENTION

In the present invention a control unit is provided having the usual externally operated controls for one or more welding parameters such as voltage and wire feed rate. Inside the control unit, and inaccessible to the welder, are at least one and preferably several pairs of potentiometers or similar controls, each pair set beforehand to provide one desired welding schedule of voltage, wire feed rate or other parameters. An override switch within the control unit, remotely positioned, or otherwise inaccessible to the welder, selects between the exterior controls and the welding schedule controls within the unit. Finally, a selector switch is provided for choosing the interior potentiometers for a given welding schedule.

When the override switch is released, the welder's discretion to change welding parameters is limited to (at most) selection of one of several preset welding schedules. When the override switch is operated, the controls on the outside of the unit are operational. One subtle effect of the described arrangement is that when the manual override switch is released, the controls on the outside of the unit serve as dummy controls. Welders are thus encouraged to experiment with dummy conrols which do not affect welding quality.

BRIEF DESCRIPTION OF DRAWING

The drawing FIGURE is a simplified schematic representation of the electrical and mechanical parts of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. While the best known embodiment has been described, the details may be changed without departing from the invention, which is defined by the claims.

The drawing FIGURE shows a preferred embodiment of the invention. In the FIGURE, the area within box 10 is a limited access portion such as the interior of a control unit, and the area outside of box 10 is a free access portion of the system commanded by the welder. In this system, the parameters to be regulated are the welding voltage and the welding wire feed rate (which in turn controls the effective welding amperage in metal inert gas welding). The usual potentiometer controls 12 and 14, each accessible to the welder, are first control means, respectively to control wire feed rate and welding voltage. Potentiometer controls can also be provided to control other parameters without changing the inventive concept.

In the embodiment shown, potentiometer 12 directly controls the resistance in circuit with the wire feed motor 16, and thus directly controls the feed rate. Potentiometer 14 regulates the gate circuit of a silicon controlled rectifier within voltage control 18 to limit the welding voltage without interposing a resistance in series with the welding arc. Such voltage control circuits are well known to the art. Welding power thus comes from power source 20, is regulated by voltage control 18, and passes via terminals 22 and 24 to the work and to the welding wire. The circuit is completed when an arc is struck.

The FIGURE shows the circuit when exterior controls 12 and 14 forming the first control means are operative. To defeat the exterior controls, mode selection means 26, here a triple pole double throw override switch, is operated by raising actuating lever 28 to disconnect contact pairs 30 and 32, 34 and 36, and 38 and 40, and simultaneously to connect contact pairs 30 and 42, 34 and 44, and 38 and 46, thus disconnecting the first control means and connecting the second control means. Switch 26 is preferably located within the control unit, but also can be located or operated remotely. In the drawing switch 26 is positioned within box 10, indicating that it is inaccessible to the welder.

More specifically, switching the override switch 26 has three independent effects.

First, the pilot light circuit within box 48 receives power from power source 50 via conductors 52 and 54. One of lamps L1, L2, L3, L4, L5, and L6 is lit depending on which lamp is connected in circuit with conductors 52 and 54 by switch element 56 forming one part of the welding schedule selector switch.

Second, wire feed rate potentiometer 12 is disconnected and the wire feed rate schedule circuit within box 58 takes its place. Operation of switch element 60 connects one of the potentiometers R1, R2, R3, R4, R5, and R6 between conductors 62 and 64 to regulate the voltage passing through wire feed motor 16, and thus its speed.

Third, welding voltage potentiometer 14 is disconnected from the voltage control circuit and replaced by one of the potentiometers (S1, S2, S3, S4, S5, and S6), comprising the voltage schedule circuit within box 65. Switch element 66 connects one of the potentiometers within box 65 between conductors 68 and 70.

Switch elements 56, 60, and 66 are simultaneously operated by switch operator 72 from the free access portion of the unit to connect the corresponding lamp, R series potentiometer, and S series potentiometer in their respective circuits. Six welding schedules are thus provided in this embodiment. Lamps L1, L2, L3, L4, L5, and L6 are preferably positioned to be visible from the exterior of the control unit, so that the welding schedule in use is clearly indicated to the operator and to others.

The R series and S series potentiometers will preferably each have the same power and resistance ratings as the potentiometers 12 and 14 so that the wire feed rate and welding voltage can be varied between approximately the same limits by the exterior and interior controls.

The present system could easily be adapted to control other parameters than welding voltage and wire feed rate, although these are typical parameters which must be controlled for good welding.

I claim:

1. An electric arc welding control unit, having means to control at least one welding parameter, comprising:
    A. a housing having an internal portion to which access is limited and an external portion to which access is not limited;
    B. first control means, operated from said external portion, to regulate each said welding parameter;
    C. second control means, located within said housing, to provide at least one preset value for each said parameter; and
    D. mode selection means, operable only from said internal portion, switchable between a first state in which said at least one parameter is controlled by said first control means and a second state in which said at least one parameter is controlled by said second control means.

2. The welding control unit of claim 1, wherein said second control means comprises plural elements for controlling at least one of said parameters.

3. The welding control unit of claim 2, further comprising a selector switch for selection of one of said plural elements to control the corresponding parameter.

4. The welding control unit of claim 3, wherein said selector switch is operable from said external portion.

5. The invention of claim 1, wherein said second control means is variable to permit a value for at least one welding parameter to be preset from within said internal portion.

6. An electric arc welding control unit, having means to control first and second welding parameters, comprising:
    A. a housing having an internal portion to which access is limited and an external portion to which access is not limited;
    B. first variable control means operated from said external portion to regulate each said parameter;
    C. second preset control means within said internal portion to provide plural welding schedules, each schedule comprising preset values for said first and second welding parameters;
    D. mode selection means, operable only from said internal portion, switchable between a first state allowing said first variable control means to be used to regulate said welding parameters and a second state allowing said second preset control means to provide one of said plural welding schedules; and
    E. selector switch means to select one of said plural welding schedules.

7. The welding control unit of claim 6, wherein said selector switch means is operable from said external portion.

8. The welding control unit of claim 7, wherein said second preset control means comprises plural pairs of presettable variable resistance elements, one pair for each welding schedule.

* * * * *